United States Patent
Chang et al.

(10) Patent No.: US 10,027,644 B2
(45) Date of Patent: Jul. 17, 2018

(54) ANALYSIS WITH EMBEDDED ELECTRONIC SPREADSHEETS

(71) Applicant: Microsoft Technology Licensing, LLC, Redmond, WA (US)

(72) Inventors: Jih-Shiang Chang, Bellevue, WA (US); Vageesh Banga, Bothell, WA (US); Madan Natu, Redmond, WA (US); Benjamin Andrew Kaiser, Bellevue, WA (US); Amandeep Singh Pandher, Seattle, WA (US); Ruchika Rawat, Seattle, WA (US); Nirav Shah, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 14/815,137

(22) Filed: Jul. 31, 2015

(65) Prior Publication Data
US 2016/0261577 A1  Sep. 8, 2016

Related U.S. Application Data

(60) Provisional application No. 62/127,420, filed on Mar. 3, 2015.

(51) Int. Cl.
*H04L 29/06* (2006.01)
*G06F 17/24* (2006.01)
(Continued)

(52) U.S. Cl.
CPC ............ *H04L 63/08* (2013.01); *G06F 17/246* (2013.01); *G06Q 30/01* (2013.01); *H04L 67/02* (2013.01);
(Continued)

(58) Field of Classification Search
CPC ...................................................... H04L 63/08
(Continued)

(56) References Cited

U.S. PATENT DOCUMENTS 5,821,937 A * 10/1998 Tonelli ................. H04L 41/12
                                                                709/225
8,429,518 B2  4/2013 Machalek
(Continued)

OTHER PUBLICATIONS

Kirkland, Suzanne., "3. ZOHO CRM—View and Edit Records in a Spreadsheet Format", Published on: Oct. 27, 2014 Available at: http://blog.marksgroup.net/2014/10/zoho-crm-view-and-edit-records-in.html.

(Continued)

*Primary Examiner* — Jacob Lipman
(74) *Attorney, Agent, or Firm* — Christopher R. Christenson; Kelly, Holt & Christenson, PLLC

(57) ABSTRACT

A computer system includes a processor and a data store coupled to the processor. A user interface module is configured to provide a user interface of a first application executed by the processor. The user interface of the first application displays a plurality of items. The processor is configured to receive a command for an embedded spreadsheet view relative to the plurality of items and responsively save an electronic spreadsheet file in the data store and interact with an electronic spreadsheet service to display the plurality of items in a spreadsheet portion of a user interface within the user interface of the first application.

16 Claims, 9 Drawing Sheets

(51) Int. Cl.
 G06Q 30/00 (2012.01)
 H04L 29/08 (2006.01)
(52) U.S. Cl.
 CPC .......... *H04L 67/10* (2013.01); *H04L 67/125* (2013.01); *H04L 67/30* (2013.01); *H04L 67/04* (2013.01)
(58) Field of Classification Search
 USPC .......................................................... 726/4
 See application file for complete search history.

(56) References Cited

U.S. PATENT DOCUMENTS

| | | | | |
|---|---|---|---|---|
| 8,880,027 | B1 * | 11/2014 | Darringer | G06F 21/35 455/41.1 |
| 2004/0098148 | A1 * | 5/2004 | Retlich | G05B 19/41885 700/83 |
| 2011/0145805 | A1 | 6/2011 | Taylor et al. | |
| 2014/0380139 | A1 | 12/2014 | Mondri et al. | |
| 2015/0026075 | A1 | 1/2015 | Mondri et al. | |

OTHER PUBLICATIONS

Totovic, Aleksandar., "Office 365: Using Excel in Microsoft Dynamics NAV", Published on: Sep. 12. 2013 Available at: https://community.dynamics.com/nav/b/nav4construction/archive/2013/09/12/office-365-using-excel-in-microsoft-dynamics-nav.aspx.

"Microsoft Dynamics CRM: A Customer Relationship Management System Integrating With Excel", Published on: Dec. 13, 2012 Available at: http://www.crmsoftwareblog.com/2012/12/microsoft-dynamics-crm-a-customer-relationship-management-system-integrating-with-excel/.

Ng, Peter., "Initiatives on Integrating Google Apps with SAP Gateway", Published on: May 7, 2014 Available at: http://scn.sap.com/community/gateway/blog/2014/05/17/initiatives-on-integrating-google-apps-with-sap-gateway.

"Real-time Integration of Excel Spreadsheets Improves SAP User Experience and Productivity", Published on: Aug. 2014 Available at: hftp://www.resourceboxe.com/assets/rjt_ebook_spreadsheet-server_aug2014_final.pdf.

"Integrate Magi Metrics and Microsoft Dynamics CRM", Retrieved on: Mar. 5, 2015 Available at: https://zapier.com/zapbook/magi-metrics/microsoft-dynamics/.

"Zoho CRM + Google Apps", Published on: Nov. 27, 2014 Available at: https://www.zoho.com/google-apps.html.

Jones, Dean.; "integrating Microsoft Excel Within the Oracle or SAP ERP Environment for Live Reporting & Analysis", Published on: Jun. 9, 2012 Available at: http://collateral.excel4apps.com/news/Director-of-Finance-Spring2012.pdf.

"Integrate Your Openerp with Google Docs", Published on: Nov. 15, 2012 Available at: http://www.serpentcs.com/serpentcs-integrate-openerp-googledocs.

Johnson, Glenn., "Google Docs Integration: Learn How to Integrate Google Docs ith your ERP and CRM Systems", Published on: Feb. 25, 2010 Available at: http://it.toolbox.com/blogs/integrate-my-jde/google-docs-integration-learn-how-to-integrate-google-docs-witn-your-erp-and-crm-systems-37139.

"NDNKoders SugarCRM Excel Add-in" Published on: Dec. 24, 2008 Available at: http://www.sugarforge.org/projects/ndnkoderexcel.

"Things That Work Well in ZOHO CRM:—Sheet View", Retrieved at <https://www.zoho.com/crm/blog/things-that-work-well-in-zoho-crm-sheet-view.html>, Retrieved on: Sep. 7, 2017, 6 pages.

* cited by examiner

ANALYSIS WITH EMBEDDED ELECTRONIC SPREADSHEETS

CROSS-REFERENCE TO RELATED APPLICATION

The present application is based on and claims the benefit of U.S. provisional patent application Ser. No. 62/127,420, filed Mar. 3, 2015, the content of which is hereby incorporated by reference in its entirety.

BACKGROUND

Electronic Spreadsheet programs, such as Microsoft's Excel, are used for storing, organizing and manipulating data. Electronic Spreadsheet programs are highly useful for business intelligence (BI) tools. Many users use such programs for reporting and analysis of corporate data. Sometimes, users in the Customer Relationship Management (CRM) field will migrate data to an electronic spreadsheet application just to perform analyses or entity management. Examples of such analyses include pipeline analysis, pipeline management, territory planning, leads filtering and generation, et cetera.

A Customer Relationship Management (CRM) system is a system that manages a company's interactions with current and future customers. The CRM system may use a variety of technology to support the various tasks related to achieving effective customer relationships.

The discussion above is merely provided for general background information and is not intended to be used as an aid in determining the scope of the claimed subject matter.

SUMMARY

A computer system includes a processor and a data store coupled to the processor. A user interface module is configured to provide a user interface of a first application executed by the processor. The user interface of the first application displays a plurality of items. The processor is configured to receive a command for an embedded spreadsheet view relative to the plurality of items and responsively save an electronic spreadsheet file in the data store. The processor is also configured to interact with an electronic spreadsheet service to display the plurality of items in a spreadsheet portion of a user interface within the user interface of the first application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Embodiments described herein generally provide a way to convert a grid of data in a first application, such as a business system, into an immersive (embedded) electronic spreadsheet experience (e.g. Excel, Google Docs) as part of the first application experience. Users can perform ad hoc analysis inside this electronic spreadsheet. Such analysis includes, without limitation, changing values without committing, adding quick formulas (e.g. incentive, compensation calculation on opportunities); adding charts to visualize the data, modifying data or adding new rows (records) and potentially pushing the modification(s) back to the first application, if desired. This becomes part of any defined process in the first application.

As used herein, an electronic spreadsheet is a term used to describe hosted and/or local applications that facilitate organization, analysis, and computation of data in tabular form, and similar services. An electronic spreadsheet application may operate on data represented as cells on an array, organized in rows and columns, and each cell of the array is an element that can contain either numeric or text data, or the results of formulas that may automatically calculate and display a value based on the contents of other cells. An example of such an electronic spreadsheet application is Excel® by Microsoft Corporation of Redmond, Wash. Such applications may provide one or more of the above listed functionality through a number of user interfaces. They may be executed on a server as a hosted service and accessed by users through thin clients such as web browsers or locally executed applications. Some of the services may be provided online and/or others may be provided offline.

In one embodiment, a connection to a server that renders electronic spreadsheet applications (e.g. Office Web Apps Server that renders Excel® Online) is achieved, authentication with the server is established, and then an electronic spreadsheet is embedded as part of the first application (such as a CRM application—e.g. Dynamics CRM, available from Microsoft). All contextual actions are provided in the first application (e.g. quick add new objects, navigation, process UI, save changes back to first application system). This "immersive" design for analyzing data in order to quickly perform ad hoc analysis or bulk edit on data using spreadsheet applications within the context of the first application improves the user experience with the first application.

Figure 1:
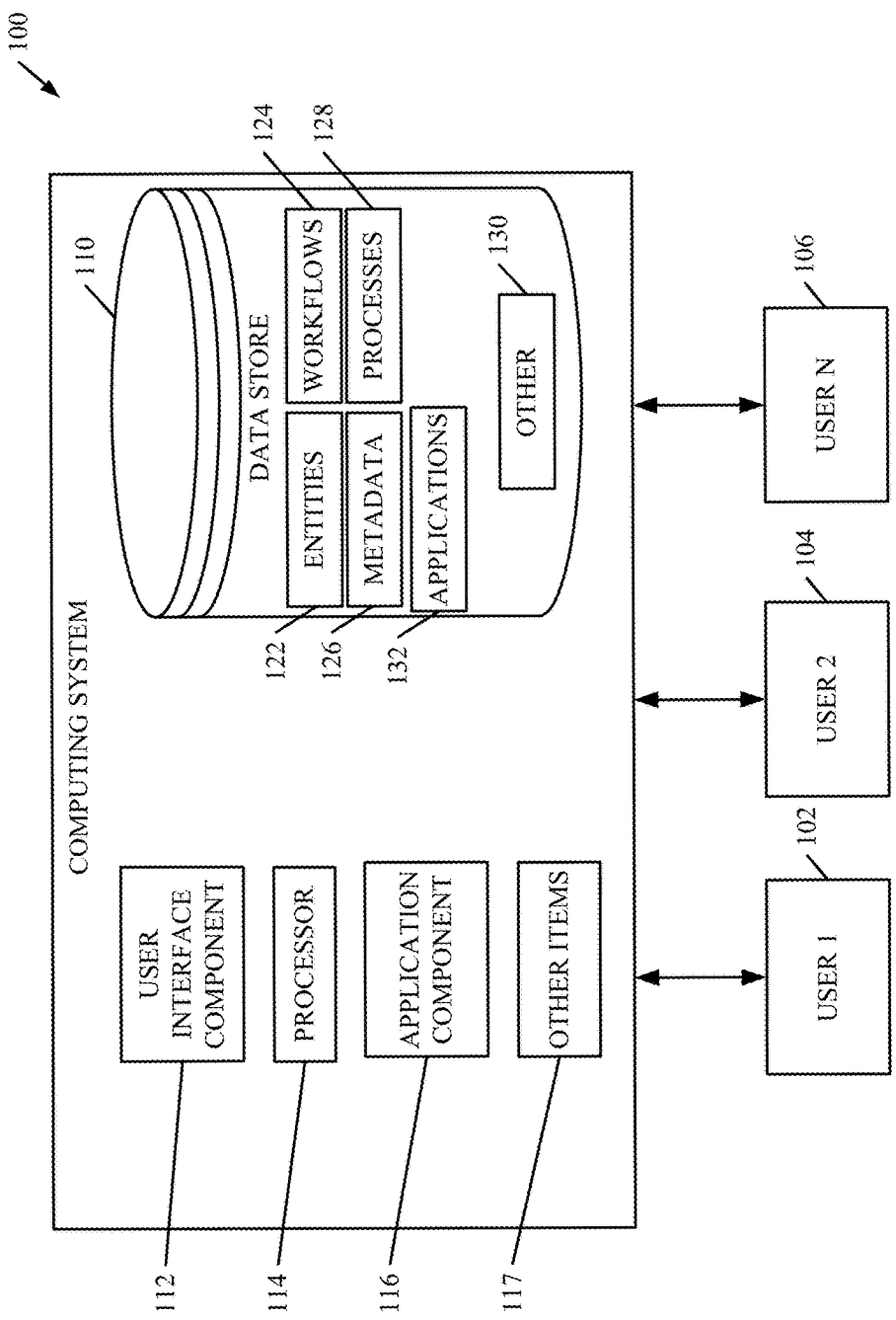
FIG. 1 is a diagrammatic view of a computing system with which embodiments described herein are particularly applicable.

FIG. 1 is a diagrammatic view of a computing system with which embodiments described herein are particularly applicable. Computing system 100 is accessible by one or more users 102, 104, 106 through one or more user interfaces. For example, each of users 102 and 104 can access computing system 100 locally, or remotely. In one example, one or more of users 102 and 104 use a respective client device that communicates with computing system 100 over a network, such as the internet, or a local area network.

Users 102 and 104 interact with user mechanisms to control and manipulate computing system 100. For instance, users 102 and 104 can access data in data store 110. User data access can include, but is not limited to, read access, write access, and/or update access to the data. Updating data can include modifying and/or deleting data in data store 110. For sake of illustration, users 102 and 104 are shown accessing system 100 in FIG. 1. However, it is understood that any number of users can access system 100.

Computing system 100 includes user interface component 112, processor 114, application component 116, and other items 117. Additionally, computing system 100 includes data store 110. Processor 114 is illustratively a computer processor with associated memory and timing circuitry (not separately shown). Processor 114 is a functional part of system 100 that is activated by, and facilitates the functionality of, other systems and components in system 100.

Data store 110, in one embodiment, includes data entities 122, workflows 124, processes 128, and applications 132. Applications 132 are implemented by application component 116 for users 102 and 104 of computing system 100 to perform processes and tasks. The information further includes metadata 126 and any other suitable data 130 that can be used by application component 116 or other items in computing system 100. Entities 122, in one embodiment, describe entities within or otherwise used by system 100.

Computing system 100 can be any type of computing system accessed by users 102 and 104. In one example, but not by limitation, computing system 100 can comprise a collaboration system, a document sharing system, a scheduling system, and/or an enterprise system. In one example, computing system 100 comprises a business system, such as an enterprise resource planning (ERP) system, a customer resource management (CRM) system, a line-of-business system, or another business system. As such, applications 132 can be any suitable applications that may be executed by system 100 in order to perform one or more functions for which system 100 is deployed. For the sake of illustration, system 100 will general be described in the context of a CRM application.

A CRM application may provide tools and capabilities for managing an organization's interactions with customers, business opportunities, and other CRM stored entities. Example tools and capabilities can include organizing, automating, and/or synchronizing sales; performing marketing analysis; providing comprehensive customer service and technical support, and maintaining an accurate representation of a customer from first contact through purchase and post-sales.

Application component 116 accesses information in data store 110 in implementing the programs, workflows, or other operations performed by the application component 116. For instance, application component 116, in one example, runs applications 132, which can include workflows 124 and processes 128. Workflows 124 and processes 128, in one example, operate upon data entities 122 as well as other data 130 in order to enable the user to perform his or her operations within system 100. In one example, user interface component 112, either by itself or under the control of other items in system 100, generates user interface displays for the users.

User interface component 112 senses physical activities, for example by generating user interface displays that are used to sense user interaction with computing system 100. The user interface displays can include user input mechanisms that sense user inputs in a wide variety of different ways, such as point and click devices (e.g. a computer mouse or trackball), a keyboard (either virtual or hardware), and/or a keypad. In embodiments where a display device is used to display the user interface displays in a touch sensitive display, the inputs may also be provided as touch gestures. Similarly, user inputs can illustratively be provided by voice inputs or other natural user interface input mechanisms as well.

Figure 2:
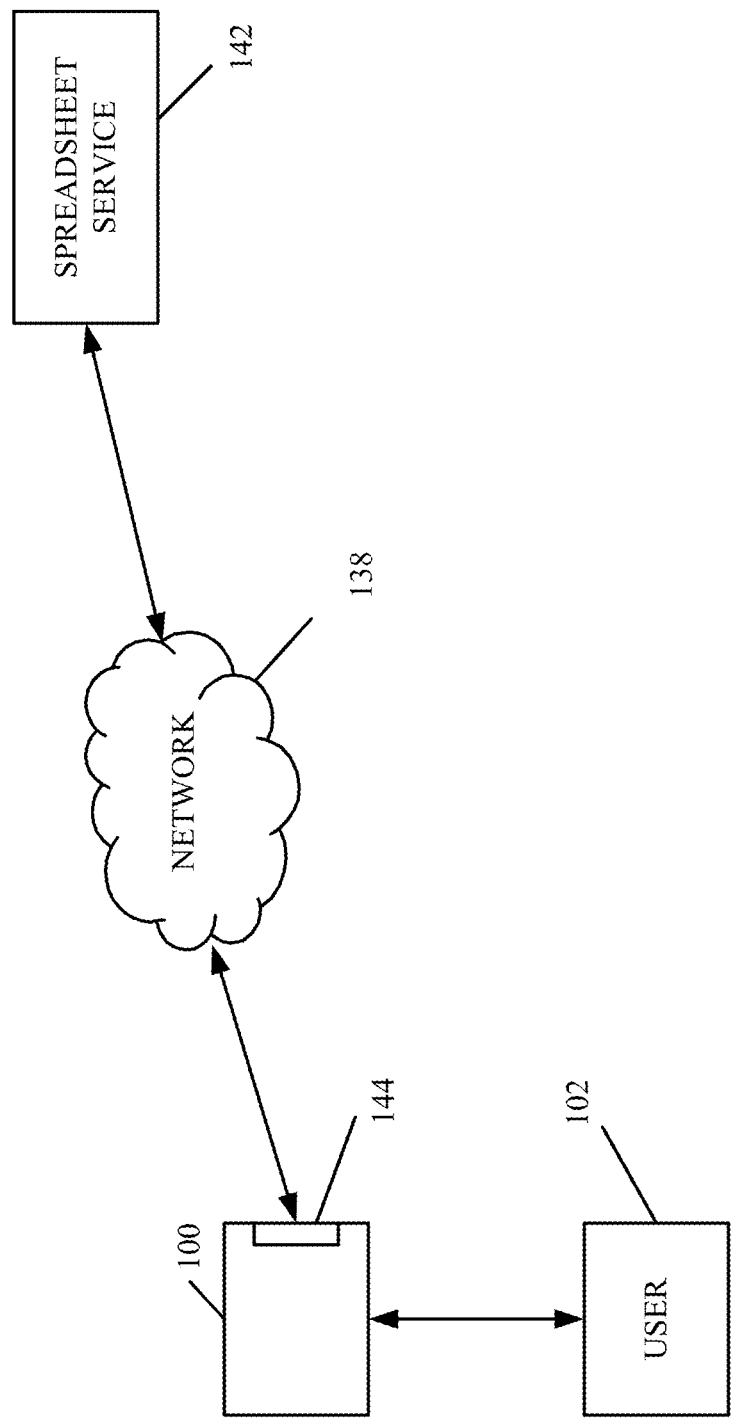
FIG. 2 is a diagrammatic view of a computing system interacting with a spreadsheet service in accordance with one embodiment.

FIG. 2 is a diagrammatic view of computing system 100 and interacting with spreadsheet service 142 via network 140 in accordance with one embodiment. As user 102 interacts with system 100, there may arise situations in which user 102 wishes to perform an ad-hoc analysis on the information presented to the user. In such situations, it is important to allow the user to perform the ad-hoc analysis in an intuitive manner and with relatively little effort. Further, in order to facilitate ad-hoc analyses where certain hypothetical or simulations can be applied to the data, it is important that the user be allowed to make significant changes to the ad-hoc information in order to see the effects of various inputs and parameters on the analysis. Then, if the user so chooses, the information set in the embedded electronic spreadsheet can be persisted back to the CRM application.

As electronic spreadsheet applications are becoming increasingly available as cloud-based applications, it is important for system 100 to automatically interact with spreadsheet service 142 on behalf of user 102 in order to handle as much of the complexity and overhead of the interaction with spreadsheet service 142, as possible. In this way, user 102 may simply select a portion of data within a data display of system 100 and then select or otherwise engage a user interface element for invoking the embedded electronic spreadsheet and have the invoked electronic spreadsheet rendered within the display and context of the user interface of system 100. In this way, the user need not manually copy or otherwise export data from system 100 nor manually invoke a spreadsheet application and perform an import of the exported data. Instead, it is as simple of a selection of data or view within system 100 and a click or other suitable interaction with a user interface element of system 100.

When user 102 select data or a view within system 100 and then engages a user interface element requesting an embedded electronic spreadsheet view, system 100 will contact spreadsheet service 142 through network 138 in order to establish an authentication session with spreadsheet service 142. In one embodiment, spreadsheet service 142 is provided by a Office Web Apps Server that renders Excel® Online. In one embodiment, authentication is provide using both a file identifier, an organization identifier, and an encrypted hash of the file identifier and the organization identifier combined. Those values are validated by making sure that the current hash matches the original hash that was sent in the URL. Once authenticated, a spreadsheet file is created and stored by system 100 in a suitable location and format, such as in data store 110 using SQL. However, other suitable locations for storing the file can be used, such as other types of local storage in system 100 and/or cloud storage subsystems. Then, API 144 is exposed by system 100 such that the WAC server of spreadsheet service 142 can call into system 100 to retrieve the stored file and then render it within system 100.

Figure 3:
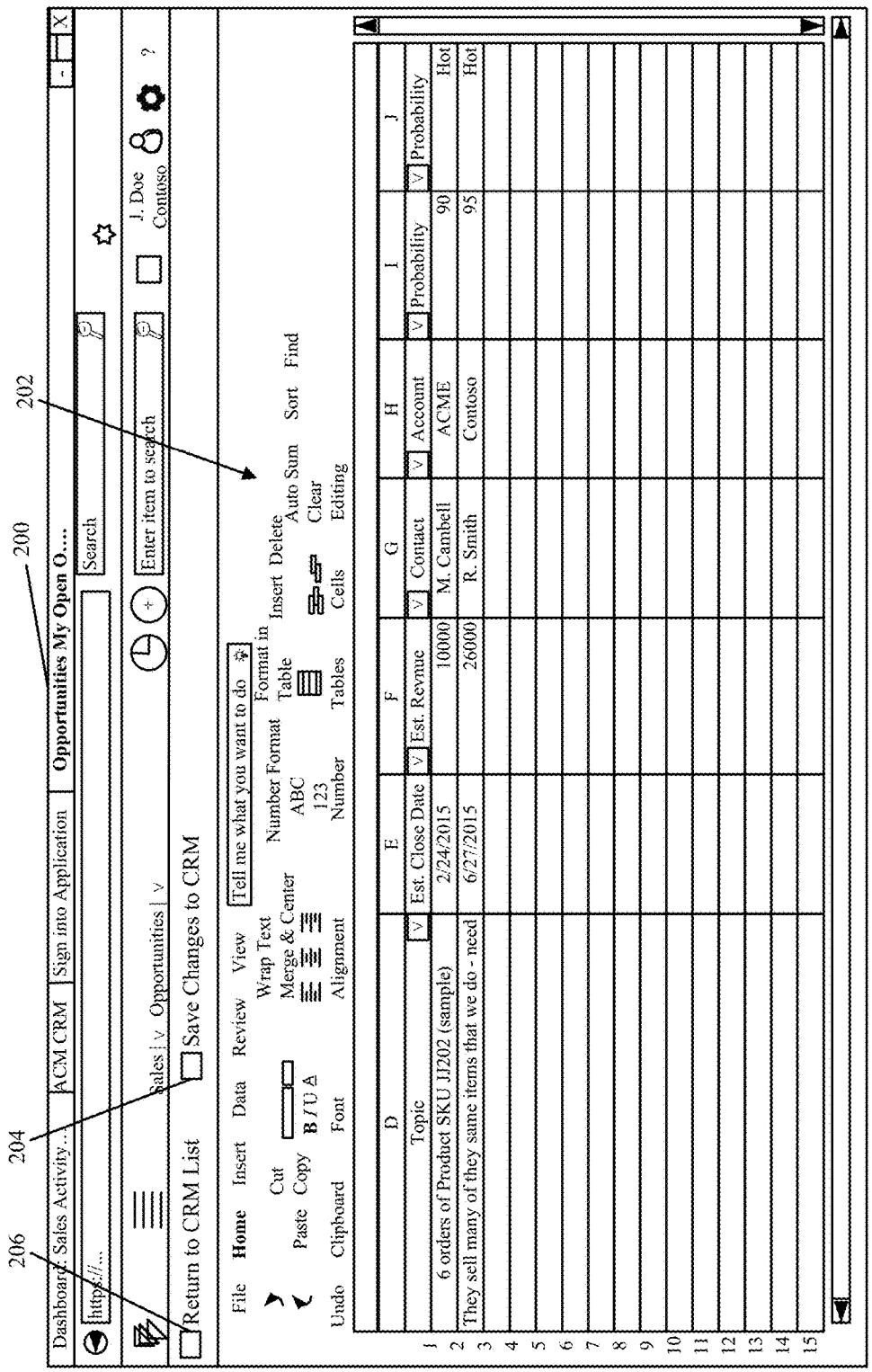
FIG. 3 is a diagrammatic screenshot of a user interface illustrating an embedded spreadsheet view of a second application within a first application in accordance with one embodiment.

FIG. 3 is a diagrammatic view of a user interface of a first system rendering an electronic spreadsheet view from a second system in accordance with one embodiment. As shown in FIG. 3, a user interface 200 is provided for a CRM application. In the example shown in FIG. 3, a user of system 100 has selected a list of items and then invoked the embedded electronic spreadsheet functionality. In response, portion 202 is provided that sets forth the selected list information from the CRM application in a row and column spreadsheet format. In one embodiment, portion 202 allows the user to engage any suitable spreadsheet tools and analytical abilities provided by spreadsheet service 142. Moreover, in one embodiment, changes made to the data illustrated in portion 202 are not persisted to the CRM system unless the user specifically indicates so. In the example shown in FIG. 3, this command for data to be persisted in the CRM system is provided by engaging button 204. Further, if the user wishes to return to the CRM listing view, button 206 can be selected and data provided in the embedded spreadsheet view can be discarded. In the event that the user has not engaged button 204 upon pressing return to CRM list button 206, any changes to the data in spreadsheet view 202 are not persisted to the CRM data store 110. In one embodiment, when changes to the data are to be persisted, or if the spreadsheet itself is to be saved, both types of save operations can be accomplished by saving the data and/or file within data store 110 of computing system 100. However, it is also expressly contemplated that such information could be saved in any suitable cloud storage system or device.

Figure 4:
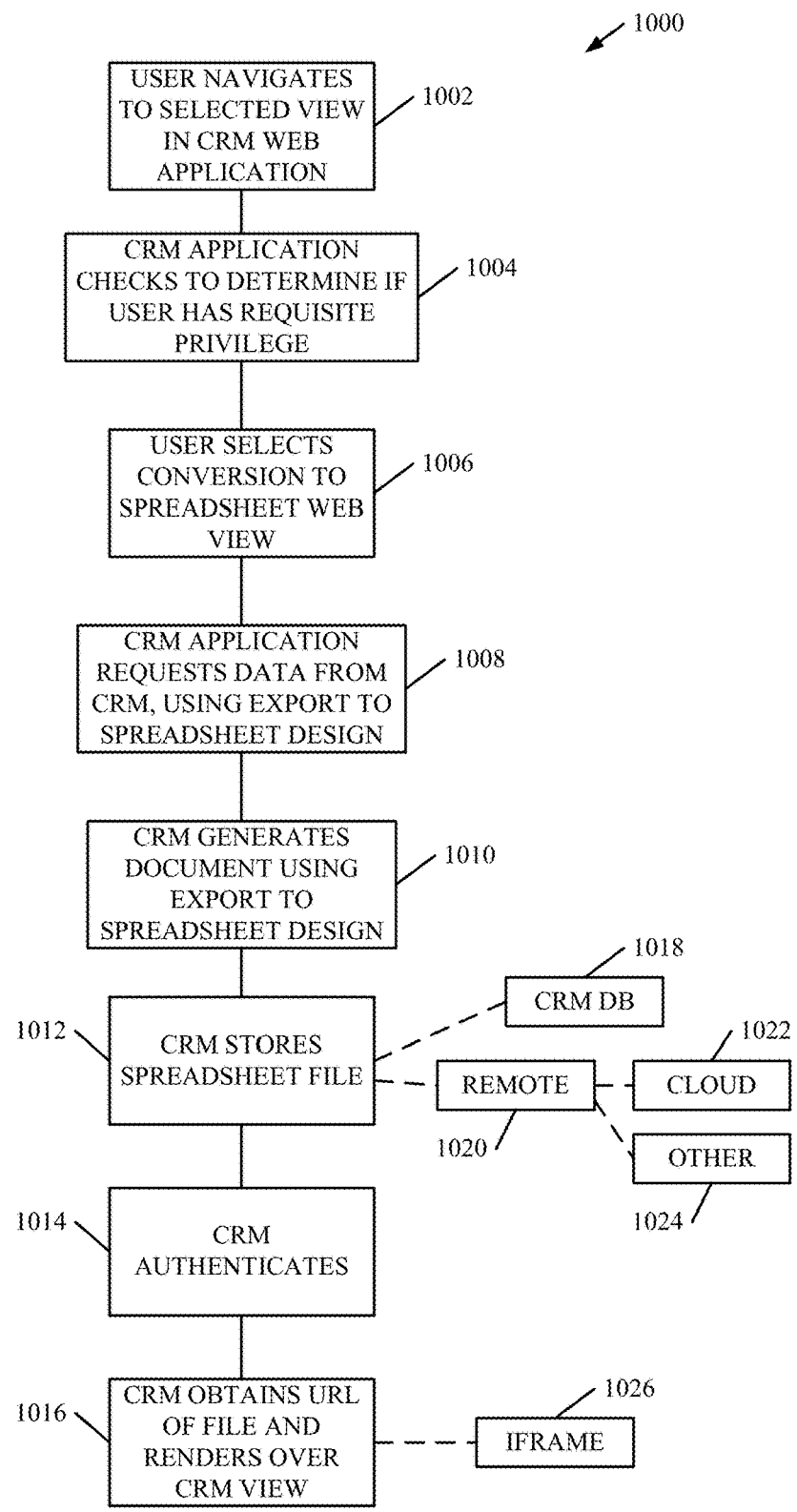
FIG. 4 is a flow diagram of a method of utilizing spreadsheet functionality within an application in accordance with one embodiment.

FIG. 4 is a flow diagram of a method of embedding an electronic spreadsheet view within a first application in accordance with one embodiment. Method 1000 begins at block 1002 where a user of a first application, such as a CRM application, navigates to a selected view in the first application. At block 1004, the first application, in one embodiment, checks to determine whether the user has the requisite privilege to perform the action. At block 1006, the user selects conversion of the current view to an embedded spreadsheet. Next, at block 1008, the first application (such as a CRM application) retrieves the data related to the user's current view. At block 1010, the first application generates an associated spreadsheet using an export to spreadsheet function. At block 1012, in one embodiment, the first application stores the file in the format of the embedded spreadsheet application within a data store of the first application, as indicated at block 1018. However, the file can be stored in any suitable location such as remote locations 1020 that include cloud storage 1022 or other remote storage 1024. Next, at block 1014, the first application, in one embodiment, authenticates with an electronic spreadsheet service provider, such as service 142, using a suitable web application open platform interface protocol (WOPI). At block 1016, the first application obtains an URL or other suitable pointer to the file and renders the file within the context of the first application, such as by using an IFRAME 1026.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
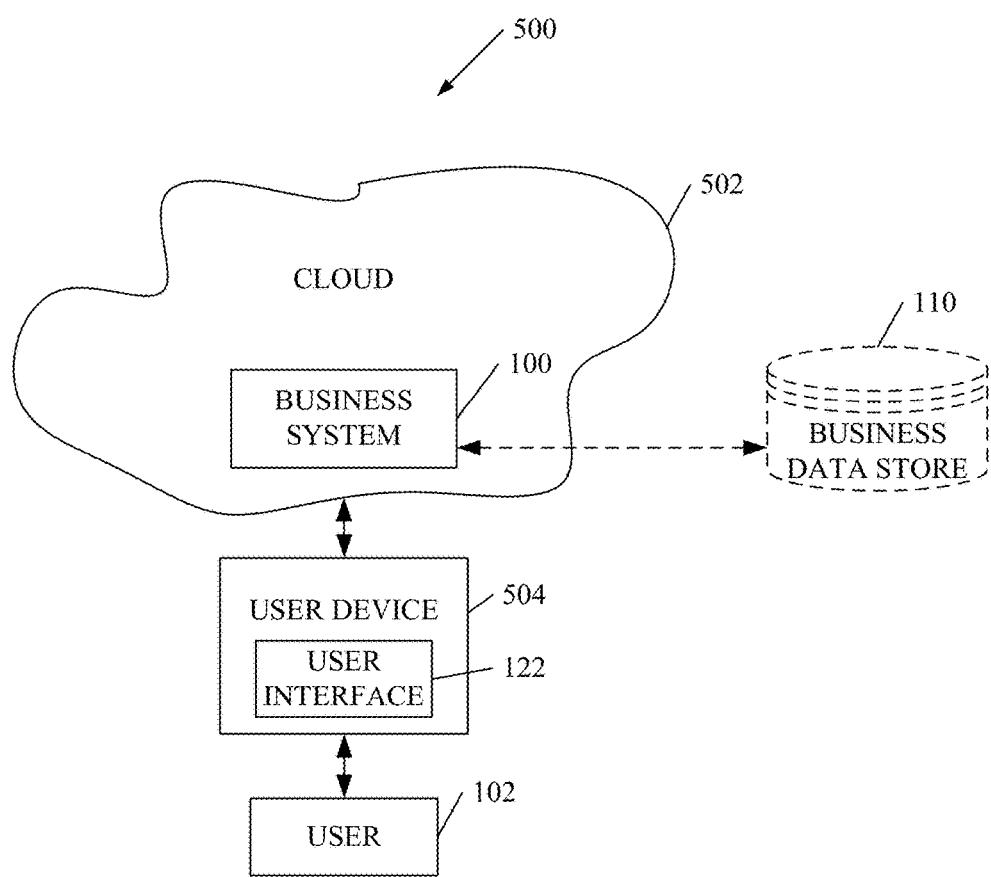
FIG. 5 is a diagrammatic view of a partial cloud embodiment.

FIG. 5 is a block diagram of a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

FIG. 5 depicts another embodiment of a cloud architecture. FIG. 5 shows that it is also contemplated that some elements of the system are disposed in cloud 502 while others are not. By way of example, data store 110 can be disposed outside of cloud 502, and accessed through cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
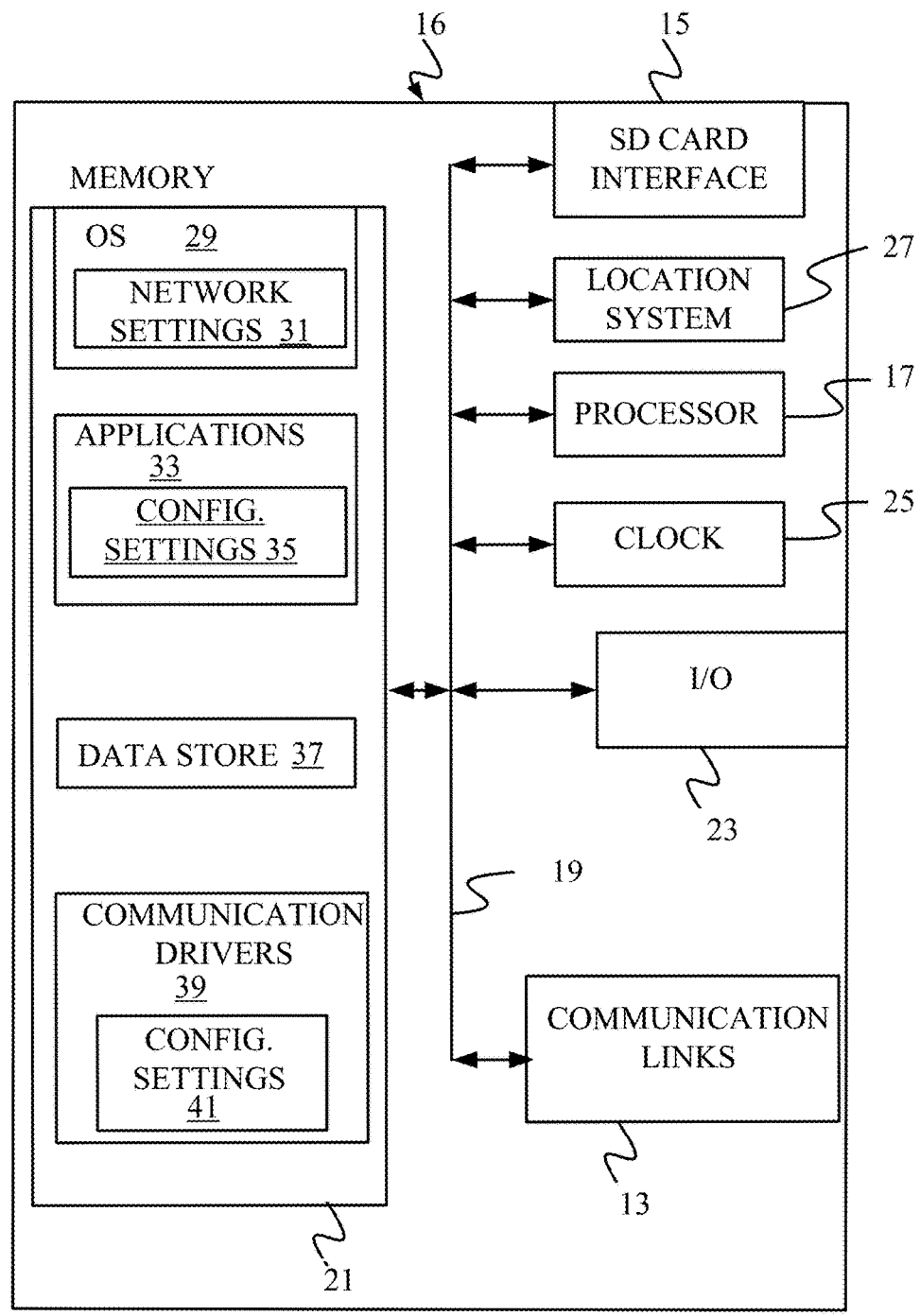
FIG. 6 is a block diagram of a mobile device useful for executing portions of or interacting with a first application serving an embedded spreadsheet in accordance with one embodiment.
Figure 7:
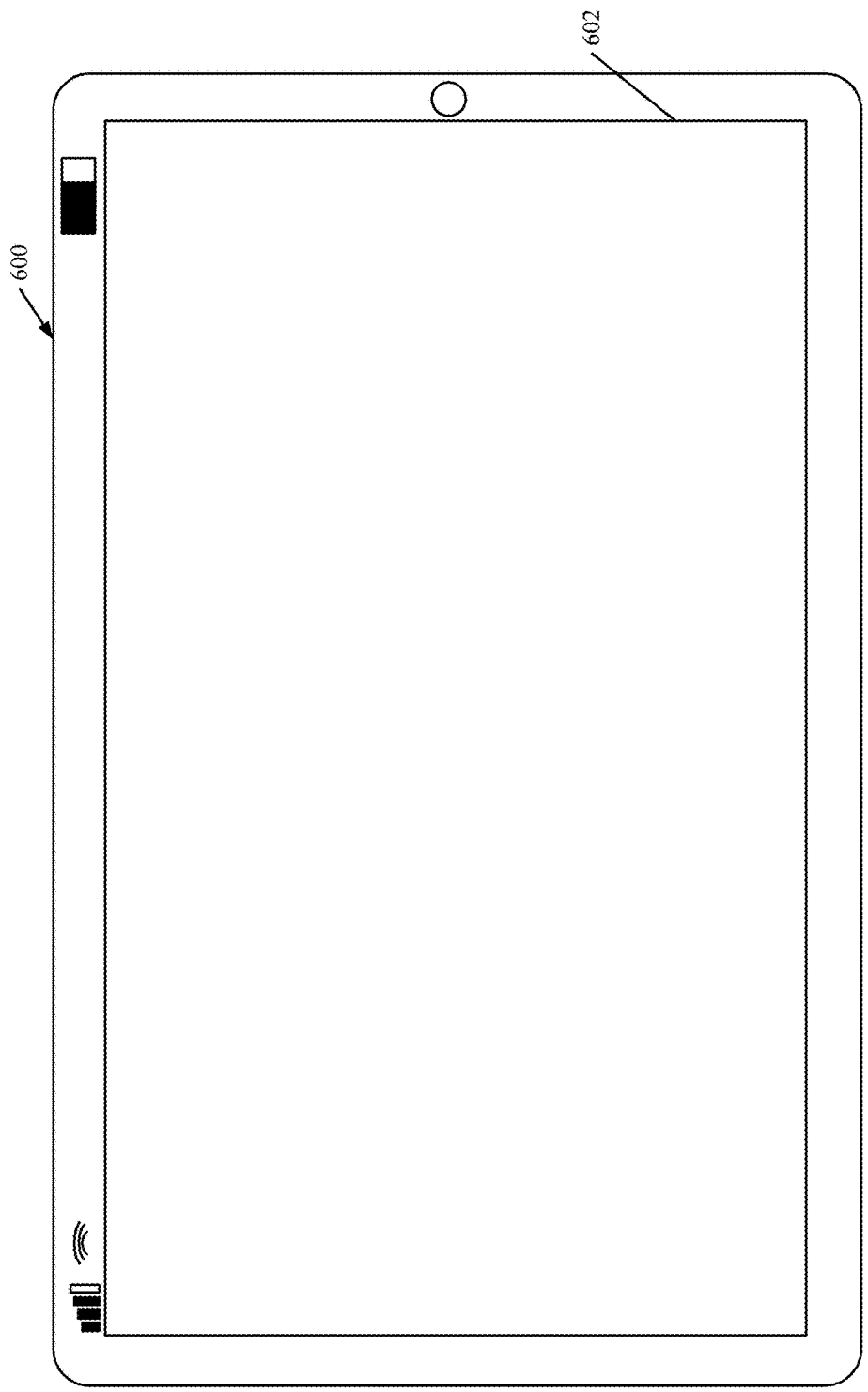
FIGS. 7 and 8 are diagrammatic views of additional computing devices with which embodiments described herein are particularly useful.
Figure 8:
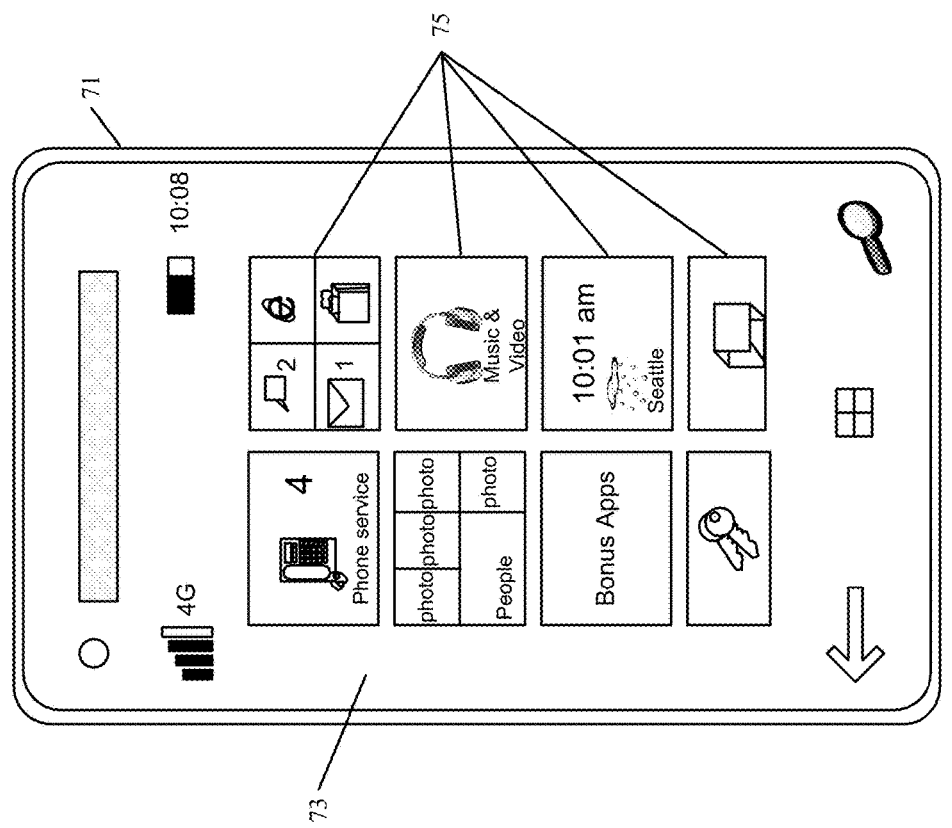

FIG. 6 is a simplified block diagram of one illustrative embodiment of a handheld or mobile computing device that can be used as a user's handheld device 16, in which the present system (or parts of it) can be deployed. FIGS. 7-8 are examples of handheld or mobile devices.

FIG. 6 provides a general block diagram of the components of a client device 16. In the device 16, a communications link 13 is provided that allows the handheld device to communicate with other computing devices and under some embodiments provides a channel for receiving information automatically. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 7 shows one embodiment in which device 16 is a tablet computer 600. In FIG. 7, computer 600 is shown with user interface display displayed on the display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Additional examples of devices 16 can be used, as well. Device 16 can be a feature phone, smart phone or mobile phone. The phone includes a set of keypads for dialing phone numbers, a display capable of displaying images including application images, icons, web pages, photographs, and video, and control buttons for selecting items shown on the display. The phone includes an antenna for receiving cellular phone signals such as General Packet Radio Service (GPRS) and 1Xrtt, and Short Message Service (SMS) signals. In some embodiments, phone also includes a Secure Digital (SD) card slot that accepts a SD card.

The mobile device can be personal digital assistant (PDA) or a multimedia player or a tablet computing device, etc. (hereinafter referred to as a PDA). The PDA can include an inductive screen that senses the position of a stylus (or other pointers, such as a user's finger) when the stylus is positioned over the screen. This allows the user to select, highlight, and move items on the screen as well as draw and write. The PDA also includes a number of user input keys or buttons which allow the user to scroll through menu options or other display options which are displayed on the display, and allow the user to change applications or select user input functions, without contacting the display. Although not shown, The PDA can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device also includes a SD card slot that accepts a SD card.

FIG. 8 shows that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 9:
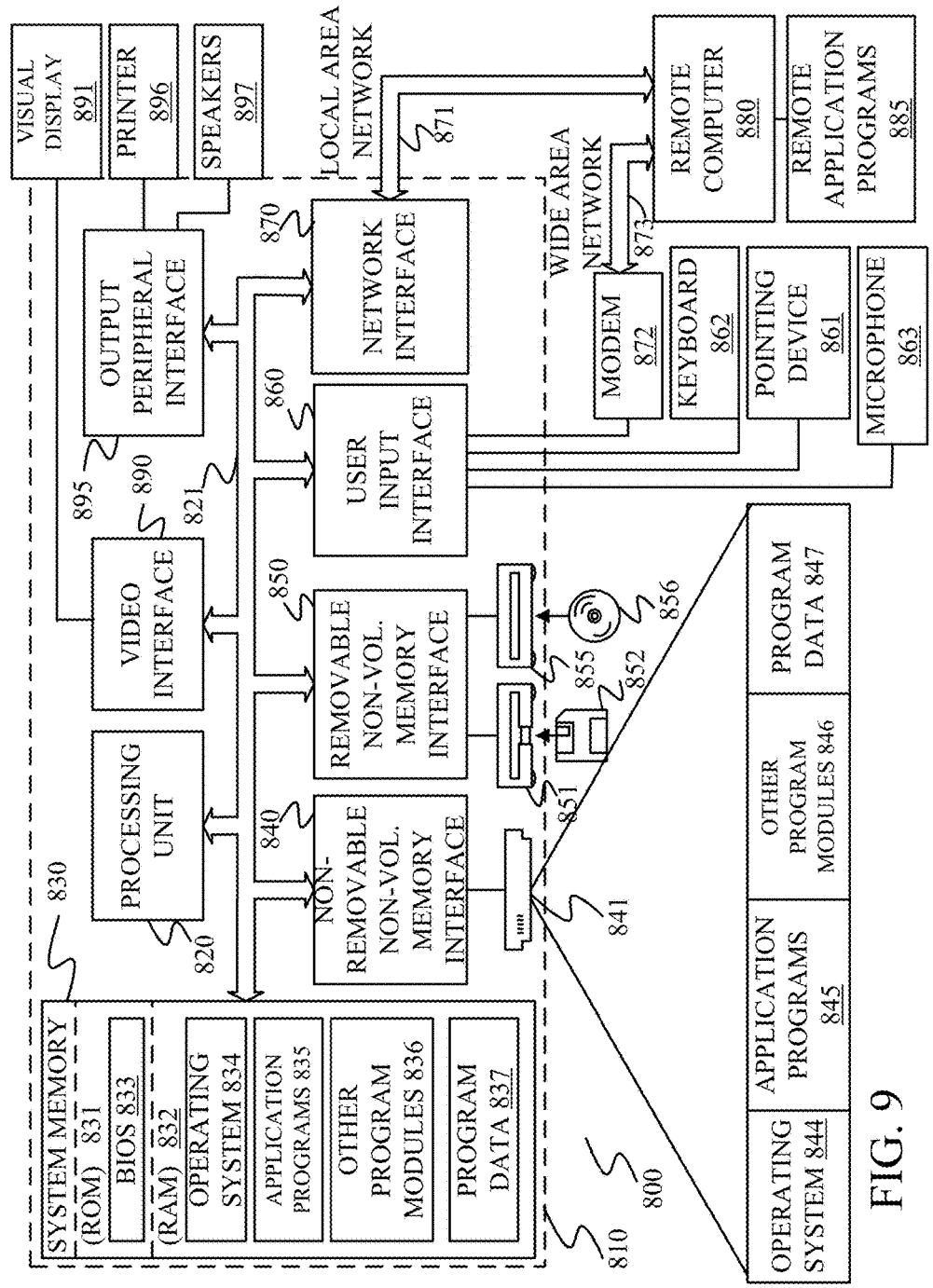
FIG. 9 is a system block diagram of a general computing system with which embodiments described herein can be practiced.

FIG. 9 is one embodiment of a computing environment in which architecture 500, or parts of it, (for example) can be deployed. With reference to FIG. 9, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computer system that includes a processor and a data store coupled to the processor. A user interface module is configured to provide a user interface of a first application executed by the processor. The user interface of the first application displays a plurality of items. The processor is configured to receive a command for an embedded spreadsheet view relative to the plurality of items and responsively save an electronic spreadsheet file in the data store and interact with an electronic spreadsheet service to display the plurality of items in a spreadsheet portion of a user interface within the user interface of the first application.

Example 2 is the computer system of any or all previous examples wherein interaction with the electronic spreadsheet service is through a network.

Example 3 is the computer system of any or all previous examples wherein interaction with the electronic spreadsheet service is in accordance with a web application open platform interface protocol.

Example 4 is the computer system of any or all previous examples wherein the computer system is configured to automatically authenticate with the electronic spreadsheet service.

Example 5 is the computer system of any or all previous examples wherein authentication is based on a file identifier and an organization identifier.

Example 6 is the computer system of any or all previous examples wherein authentication is also based on a hash of the file identifier and the organization identifier.

Example 7 is the computer system of any or all previous examples wherein authentication information transmitted by the computer system is encrypted.

Example 8 is the computer system of any or all previous examples and further comprising an application programming interface exposed to the electronic spreadsheet service.

Example 9 is the computer system of any or all previous examples wherein the display of the plurality of items in the spreadsheet portion is provided within an IFRAME.

Example 10 is the computer system of any or all previous examples and further comprising providing a user interface element that, when actuated, causes items in the spreadsheet portion of the user interface to be saved in the data store.

Example 11 is the computer system of any or all previous examples wherein the electronic spreadsheet file is saved using SQL.

Example 12 is the computer system of any or all previous examples and further comprising providing a user interface element that, when actuated, reverts from the spreadsheet portion of a user interface to the first user interface.

Example 13 is the computer system of any or all previous examples wherein reversion to the first user interface is performed without saving the items in the spreadsheet portion of the user interface to be saved in the data store.

Example 14 is the computer system of any or all previous examples wherein the computer system is a CRM system.

Example 15 is a computer-implemented method of providing analysis of data displayed in a first application. The method includes displaying a plurality of data items in a user interface of the first application. A request is received to convert the display of data items to an embedded electronic spreadsheet. An electronic spreadsheet file is automatically generated using the plurality of data items displayed in the user interface of the first application. The electronic spreadsheet file is saved. Authentication with remote electronic spreadsheet provider service is performed. The remote electronic spreadsheet service is caused to provide a spreadsheet view of the electronic spreadsheet file. The spreadsheet view is rendered within the user interface of the first application.

Example 16 is the computer-implemented method of any or all previous examples and further comprising receiving changes to data items displayed in the spreadsheet view.

Example 17 is the computer-implemented method of any or all previous examples and further comprising receiving a command to revert to the user interface of the first application and reverting to the first user interface without saving changes to the data items displayed in the spreadsheet view.

Example 18 is the computer-implemented method of any or all previous examples and further comprising receiving a command to save changes to the data items displayed in the spreadsheet portion and responsively saving changes to associated data of the first application.

Example 19 is the computer-implemented method of any or all previous examples wherein the electronic spreadsheet file is saved in a data store of the first application.

Example 20 is a computer system that includes a processor and a computer readable medium having instructions stored thereon that, when executed by the processor, provide a first user interface displaying a plurality of items. The processor is configured to receive a command for an embedded spreadsheet view relative to the plurality of items and responsively save an electronic spreadsheet file and automatically authenticate with an electronic spreadsheet service to display the plurality of items in a spreadsheet portion of a user interface within the user interface of the first application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system for providing an embedded spreadsheet display within a customer relationship management (CRM) application, the computer system comprising:
    a processor;
    a data store coupled to the processor;
    a user interface module configured to provide a user interface of the CRM application executed by the processor, the user interface of the CRM application displaying a plurality of items; and
    wherein the processor is configured to receive a command for an embedded spreadsheet view relative to the plurality of items and responsively save an electronic spreadsheet file in the data store and automatically authenticate with the electronic spreadsheet service through a network based on a file identifier and an organization identifier and interact with the electronic spreadsheet service to display the plurality of items in a spreadsheet portion within the user interface of the CRM application.

2. The computer system of claim 1, wherein interaction with the electronic spreadsheet service is in accordance with a web application open platform interface protocol.

3. The computer system of claim 1, and further comprising an application programming interface exposed to the electronic spreadsheet service.

4. The computer system of claim 1, wherein the display of the plurality of items in the spreadsheet portion is provided within an inline frame.

5. The computer system of claim 1, wherein authentication is also based on a hash of the file identifier and the organization identifier.

6. The computer system of claim 5, wherein authentication information transmitted by the computer system is encrypted.

7. The computer system of claim 1, and further comprising providing a user interface element that, when actuated, causes items in the spreadsheet portion of the user interface to be saved in the data store.

8. The computer system of claim 7, wherein the electronic spreadsheet file is saved using SQL.

9. The computer system of claim 7, and further comprising providing a user interface element that, when actuated, reverts from the spreadsheet portion to the user interface of the CRM application.

10. The computer system of claim 9, wherein reversion to the first user interface is performed without saving the items in the spreadsheet portion to be saved in the data store.

11. A computer-implemented method of providing analysis of data displayed in a customer relationship management (CRM) application, the method comprising:
displaying data items in a user interface of the CRM application;
receiving a request to convert the display of data items to an embedded electronic spreadsheet;
automatically generating an electronic spreadsheet file using the plurality of data items displayed in the user interface of the CRM application;
saving the electronic spreadsheet file;
authenticating with a remote electronic spreadsheet provider service based on a file identifier and an organization identifier;
causing the remote electronic spreadsheet service to provide a spreadsheet view of the electronic spreadsheet file; and
rendering the spreadsheet view within the user interface of the CRM application.

12. The computer-implemented method of claim 11, wherein the electronic spreadsheet file is saved in a data store of the CRM application.

13. The computer-implemented method of claim 11, and further comprising receiving changes to data items displayed in the spreadsheet view.

14. The computer-implemented method of claim 13, and further comprising receiving a command to revert to the user interface of the CRM application and reverting to the user interface of the CRM application without saving changes to the data items displayed in the spreadsheet view.

15. The computer-implemented method of claim 13, and further comprising receiving a command to save changes to the data items displayed in the spreadsheet portion and responsively saving changes to associated data of the CRM application.

16. A computer system for providing an embedded spreadsheet display within a customer relationship management (CRM) application, the computer system comprising:
a processor;
a computer readable medium having instructions stored thereon that, when executed by the processor, provide a CRM user interface displaying a plurality of items; and
wherein the processor is configured to receive a command for an embedded spreadsheet view relative to the plurality of items and responsively save an electronic spreadsheet file and automatically authenticate with a remote electronic spreadsheet service based on a file identifier and an organization identifier to display the plurality of items in a spreadsheet portion of a user interface within the user interface of the CRM application.

* * * * *